3,700,501
PROCESS FOR PRODUCING XYLOSE
Urs Gasche, Luterbach, Herbert Lindlar, Reinach, Max Rutishauser, Attisholz, Riedholz, and Kurt Steiner, Starrkirch, Switzerland, assignors to Hoffmann-La Roche Inc., Nutley, N.J.
No Drawing. Filed Feb. 9, 1971, Ser. No. 114,060
Claims priority, application Switzerland, Feb. 20, 1970, 2,442/70
Int. Cl. C13k 9/00
U.S. Cl. 127—43                    21 Claims

ABSTRACT OF THE DISCLOSURE

A process for producing xylose from a powder obtained from sulfite waste liquors by treating the powder with a mixture of an organic solvent having strong extraction properties, an organic solvent having weak extraction properties, and 0.5–2.5 percent by volume water.

BACKGROUND OF THE INVENTION

The sugar commonly designated as xylose, occurring in nature in free form in bamboo shoots, has the absolute D-configuration and exists in the following forms:

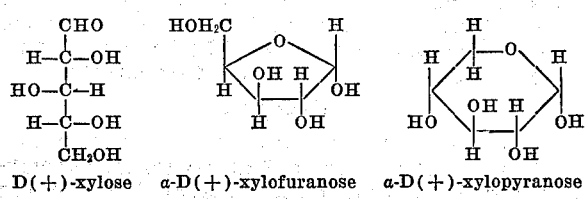

D(+)-xylose     α-D(+)-xylofuranose     α-D(+)-xylopyranose

Xylose is the key substance for the manufacture of xylitol, a sugar of the formula:

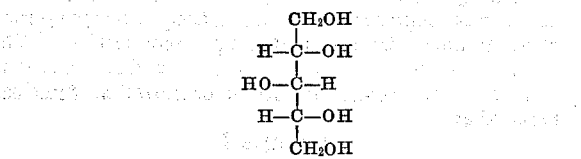

occurring in nature in mushrooms. Xylitol has a very pleasant pure sweet taste. The sugar is resorbed by the human organism without affecting the glucose content of the blood. Xylitol is therefore an ideal sweetener for diabetics.

It has long been a desired expedient to produce xylose economically from waste materials, particularly the waste materials which accrue in the manufacture of cellulose. It is known that waste sulfite liquors from deciduous trees are especially rich in pentoses. For example, arabinose, ribose, and xylose are found in deciduous waste liquors from the sulfite process for making cellulose. Therefore, many processes have been attempted to provide a simple and economic means for isolating xylose from these sulfite waste liquors. However, these processes have proven unsuccessful due to difficulty of separating xylose from other materials in extracts obtained from these sulfite waste liquors. Therefore, despite the use of a wide variety of solvents no simple and economic means has been provided for isolating xylose in pure crystalline form from sulfite waste liquors.

One means whereby it was attempted to isolate crystalline xylose from sulfite waste liquors was by first purifying the sulfite liquors prior to extraction. In this procedure, the sulfite waste liquors were distilled to remove volatile acids and precipitated to remove the non-volatile acids. However, even with these purification techniques, the crystallization inhibiting impurities were not removed. Therefore, by this procedure, xylose was not recovered from the sulfite waste liquors in crystalline form.

SUMMARY OF THE INVENTION

In accordance with this invention, it has been found that xylose can be recovered in pure crystalline form from waste sulfite liquors produced in the manufacture of cellulose by first forming a dry powder from said liquor and then extracting the xylose from the dry powder with a mixture of solvents containing an organic solvent having strong extraction properties and an organic solvent having weak extraction properties. The xylose can be easily isolated in crystalline form from the resulting extract.

The above process provides a simple and economic means for isolating xylose in pure crystalline form from sulfite waste liquors. The use of the particular solvent mixture in accordance with this invention extracts the xylose from the other ballast substances in the sulfite waste liquors so that the xylose can be isolated in pure crystalline form from the extract. The xylose obtained in accordance with this invention can be quantitatively hydrogenated to xylitol.

DETAILED DESCRIPTION

The starting materials that are used in the process of this invention can be the sulfite waste liquors obtained in the manufacture of cellulose from the wood of deciduous trees. Hence, any conventional waste liquor from the sulfite process of making cellulose from deciduous trees can be utilized. Among the deciduous trees whose wood is particularly useful in preparing the sulfite waste liquor for use in this process are included maple, birch, beech, alda, ash, aspen, lime and poplar.

These waste liquors obtained from the sulfite process of producing cellulose from deciduous wood generally have a pH of about 2.5. Furthermore, these waste liquors, beside being rich in xylose are rich in other pentose sugars such as arabinose, ribose, etc., which are difficult to separate from the xylose.

In carrying out the process of this invention, the sulfite waste liquors should be neutralized to a pH of about 6.5 to about 7.5. This neutralization can be accomplished by the addition of a base. Any base capable of neutralizing these sulfite waste liquors to a pH of from 6.5 to 7.5 can be utilized for this purpose. Among the bases which can be utilized are the alkali metal hydroxides such as sodium hydroxide; alkaline earth metal hydroxides such as calcium hydroxide; alkali or alkaline earth metal oxides such as calcium oxide; alkali or alkaline earth metal carbonates such as sodium carbonate or calcium carbonate. This adjustment to the neutral point (pH about 6.5 to about 7.5) is best effected by the addition of caustic soda.

The drying of the neutralized sulfite waste liquors can take place by any of the conventional drying techniques. In accordance with this invention, the neutralized sulfite liquors should be dried to a residual water content of at most about 5% by weight of the powder. Generally, the dry powders utilized in accordance with this invention contain a residual water content of from about 2% to about 5% by weight based upon the weight of the powder. In obtaining the dry powder containing this residual water content from sulfite waste liquors, any conventional method of drying can be utilized.

One means of obtaining this sulfite waste liquor in dry form is first concentrating the waste sulfite liquors and then spray drying the concentrated waste liquors. The step of concentration can be carried out before or after the neutralizing step. On the other hand, the concentration step may be eliminated completely and the waste sulfite liquors may be directly spray dried to a dry powder after neutralization.

If it is desired to first concentrate the sulfite waste liquors prior to spray drying, it is generally preferred to concentrate these liquors to a water content of from 30% to about 55% by weight with 35% to 45% by weight being especially preferred. In carrying out the concentration step, any conventional method of concentration can be used as long as the temperature used does not exceed 130° C. In the step of spray drying, the temperature utilized should not exceed 130° C. In spray drying, it is generally preferred to maintain the outlet temperature at about 90° C. to 130° C.

The fine powder which results usually contains from about 2% to 5% by weight of water and because of its large surface is ideally suited for the extraction of xylose.

In the past, it has been very difficult to extract xylose from the other sugars particularly the pentoses which are present in the sulfite waste liquors. This has been due to the fact that all of these sugars have the same solubility properties. That is, it has been found that the dry powder obtained from neutralized deciduous sulfite waste liquors is soluble without residue in practically all solvents that come into consideration for the extraction of xylose. Therefore, it has been necessary to find a means of extracting xylose into a solution free from the other solid materials present in the sulfite waste liquor.

In accordance with this invention, it has been found that when the dry powder obtained from neutralized deciduous sulfite waste liquor is extracted with a mixture containing an organic solvent having extracting promoting properties, an organic solvent having extraction inhibiting properties and a small amount of water, the xylose is selectively extracted from the other solid materials in the sulfite waste liquors, leaving xylose free from other solid materials such as the sugars which are present in the sulfite waste liquors.

Of the solvents which have strong extraction action, methanol, ethanol or mixtures thereof can be utilized in accordance with this invention. The solvents which have weak extraction properties or inhibit solvent extraction which are utilized in accordance with this invention are isopropanol, acetone, methyl ethyl ketone or mixtures thereof.

The solvent mixture for use in this invention contains from 30% to 70% by volume of the organic solvent having strong extraction properties, i.e., methanol, ethanol or mixtures thereof; 30% to 70% by volume of the organic solvent having weak extraction properties, i.e., acetone, isopropanol, methyl ethyl ketone or mixtures thereof and from 0.5% to 2.5% by volume of water.

Particularly advantageous are mixtures of the following composition:

—40 vol. percent methanol [or ethanol], 60 vol. percent isopropanol, 1.7 vol. percent water;
—30 vol. percent methanol [or ethanol], 70 vol. percent acetone, 1.6 vol. percent water;
—40 vol. percent methanol [or ethanol], 60 vol. percent methyl ethyl ketone, 0.7 vol. percent water.

Under certain circumstances, apart from methanol or ethanol alone there can also be used a mixture of methanol and ethanol and instead of isopropanol or acetone or methyl ethyl ketone there can also be used a mixture of these three compounds or a mixture of two of these three compounds.

The extraction can be carried out in a temperature range lying between room temperature and the boiling temperature of the solvent mixture or, in a closed system, also at temperatures which lie 10–20° C. above the boiling point of the solvent mixture. A temperature of about 60° C. has been found advantageous.

The xylose which is present without any impurities in the extract can, if desired, be isolated from the extract by conventional means such as concentration.

After concentration, the xylose extracted from the deciduous sulfite waste liquor dry powder crystallizes spontaneously from methanol with a degree of purity of over 99%. Thus, the xylose obtained by this process is practically analytically pure. The xylose obtained melts at 143–144° C. If desired the xylose need not be isolated from the extract, since this extract can be directly hydrogenated.

The present invention is accordingly concerned with a process for the production of xylose from the sulfite waste liquors accruing in the manufacture of cellulose, which is characterized in that a neutralized and optionally preconcentrated sulfite waste liquor from deciduous trees is dewatered by spray drying and the dry powder obtained is extracted with a solvent mixture consisting of methanol or ethanol on the one hand and ispropanol or acetone or methyl ethyl ketone on the other hand to which a small amount of water has been added and the xylose obtained is optionally isolated in crystalline form.

The xylose obtained in accordance with the invention can be quantitatively hydrogenated to xylitol in a manner known per se in a chemical or catalytic way. It is not absolutely necessary to isolate the xylose obtained in accordance with the invention in crystalline form before the hydrogenation. The concentrate obtained can also be directly dissolved in water and, for example, hydrogenated in the presence of Raney-nickel. The following examples are illustrative but not limitative of the invention.

Example 1

800 l. of beechwood sulfite waste liquors with a dry substance content of about 18 wt. percent are evaporated at about 70° C. under reduced pressure. The liquor concentrated to about 58 wt. percent solid content [250 kg.] is treated portionwise with stirring at 60° C. with a total of 3.5 kg. of calcium hydroxide. In so doing, the initial pH value of 2.8 rises to 6.5. The pH value is adjusted to 6.9 by cautious addition of a solution of 250 g. of sodium hydroxide in water. The neutralized beechwood sulfite waste liquor concentrate is subsequently spray-dried in an atomizer dryer [outlet temperature 130° C.]. The dry powder obtained [150 kg.] with a residual water content of 2.2 wt. percent is further processed as described hereinafter.

Example 2

150 kg. of the beechwood sulfite waste liquor dry powder with a residual water content of 2.2% and a pH of 6.9 manufactured in accordance with Example 1 are introduced into a mixture of 280 l. of methanol, 420 l. of isopropanol and 11.9 l. of deionized water. With stirring, the mixture is heated to 60–70° C., cooled to 50° C. after 1 hour and centrifuged off in 4 parts. Each individual residue is washed with a mixture of 20 l. of methanol and 30 l. of isopropanol. The washed-out residues are again combined and once more extracted with a mixture of 200 l. of methanol, 300 l. of isopropanol and 11.9 l. of water as described hereinbefore. The combined extraction solutions are evaporated under reduced pressure at about 40° C. The oily residue is taken up in 70 l. of methanol and heated to about 50–60° C. The resulting clear solution is seeded with xylose crystals and, with constant stirring, slowly cooled to —5° C. within 24 hours. The xylose which thereby crystallizes out is separated off, washed with 10 l. of cold methanol and dried; M.P. 143–144° C.

Example 3

150 kg. of the beechwood sulfite waste liquor dry powder with a residual water content of 2.2% and a pH of 6.9 manufactured according to Example 1 are introduced into a mixture of 210 l. of methanol, 490 l. of acetone and 11.2 l. of deionized water. With stirring, the mixture is heated to 60–70° C., cooled to 50° C. after 1 hour and centrifuged off in 4 parts. Each individual residue is washed with a mixture of 15 l. of methanol and 35 l. of acetone. The washed-out residues are again combined and once more extracted with a mixture of 150 l. of methanol, 350 l. of acetone and 11.2 l. of water as described hereinbefore. The combined extraction solutions are evaporated under reduced pressure at about 40° C. The oily residue is taken up in 70 l. of methanol and heated to about 50–60° C. The resulting clear solution is seeded with xylose crystals and, with constant stirring, slowly cooled to −5° C. within 24 hours. The xylose which thereby crystallizes out is separated off, washed with 10 l. of cold methanol and dried; M.P. 143–144° C.

Example 4

150 kg. of the beechwood sulfite waste liquor dry powder with a residual water content of 2.2% and a pH of 6.9 manufactured according to Example 1 are introduced into a mixture of 280 l. of methanol, 420 l. of methyl ethyl ketone and 4.9 l. of deionized water. With stirring, the mixture is heated to 60–70° C., cooled to 50° C. after 1 hour and centrifuged off in 4 parts. Each individual residue is washed with a mixture of 20 l. of methanol and 30 l. of methyl ethyl ketone. The washed-out residues are again combined and once more extracted with a mixture of 200 l. of methanol, 300 l. of methyl ethyl ketone and 4.9 l. of water as described hereinbefore. The combined extraction solutions are evaporated under reduced pressure at about 40° C. The oily residue is taken up in 70 l. of methanol and heated to about 50–60° C. The resulting clear solution is seeded with xylose crystals and, with constant stirring, slowly cooled to −5° C. within 24 hours. The xylose which thereby crystallizes out is separated off, washed with 10 l. of cold methanol and dried; M.P. 143–144° C.

We claim:

1. A process for separating xylose from sulfite waste liquors produced in the manufacture of cellulose comprising forming a dry powder from said liquors, and extracting said dry powder with a solvent mixture containing 0.5% to 2.5% by volume water, an organic solvent having strong extraction properties and an organic solvent having weak extraction properties to produce an extract containing xylose free from the other sugars present in the sulfite waste liquors.

2. The process of claim 1 wherein said organic solvent having strong extraction properties is selected from the group consisting of methanol, ethanol and mixtures thereof and the solvent having weak extraction properties is selected from the group consisting of isopropanol, acetone, methyl ethyl ketone and mixtures thereof.

3. The proess of claim 2 wherein the mixture contains from about 30% to about 70% by volume of said solvent having strong extraction properties and from about 30% to about 70% by volume of said solvent having weak extraction properties.

4. A process for producing xylose from sulfite waste liquors produced in the manufacture of cellulose, comprising forming a dry powder from said liquors, extracting said dry powder with a solvent mixture containing 0.5% to 2.5% by volume water, an organic solvent having strong extraction properties and an organic solvent having weak extraction properties to produce an extract containing xylose free from the other sugars present in the sulfite waste liquors, and crystallizing said xylose from said extract.

5. The process of claim 4 wherein said organic solvent having strong extraction properties is selected from the group consisting of methanol, ethanol and mixtures thereof and the solvent having weak extraction properties is selected from the group consisting of isopropanol, acetone, methyl ethyl ketone and mixtures thereof.

6. The process of claim 5 wherein the mixture contains from about 30% to about 70% by volume of said solvent having strong extraction properties and from about 30% to about 70% by volume of said solvent having weak extraction properties.

7. A process for separating xylose from sulfite waste liquors produced in the manufacture of cellulose comprising neutralizing the sulfite waste liquors to a pH of from about 6.5 to about 7.5, concentrating said liquors to a powder containing at most 5% by weight, and extracting said dry powder with a solvent mixture containing 0.5% to 2.5% by volume water, an organic solvent having strong extraction properties and an organic solvent having weak extraction properties to produce an extract containing xylose free from the other sugars present in the sulfite waste liquors.

8. The process of claim 7 wherein said organic solvent having strong extraction properties is selected from the group consisting of methanol, ethanol and mixtures thereof and the solvent having weak extraction properties is selected from the group consisting of isopropanol, acetone, methyl ethyl ketone and mixtures thereof.

9. The process of claim 8 wherein the mixture contains from about 30% to about 70% by volume of said solvent having strong extraction properties and from about 30% to about 70% by volume of said solvent having weak extraction properties.

10. The process of claim 9 wherein the sulfite liquors are waste liquors obtained from deciduous wood.

11. The process of claim 9 wherein the liquors are concentrated to said powder by spray drying at a temperature of about at most 130° C.

12. The process of claim 11 wherein the waste sulfite liquors produced in the manufacture of cellulose are preconcentrated to a water content of from about 30% to about 55% by weight prior to neutralization.

13. The process of claim 11 wherein the waste sulfite liquors are preconcentrated to a water content of from about 30% to about 55% prior to spray drying.

14. A process for producing xylose from sulfite waste liquors produced in the manufacture of cellulose, comprising neutralizing the sulfite waste liquors to a pH of from about 6.5 to about 7.5, concentrating said liquors to a powder containing at most 5% by weight, extracting said dry powder with a solvent mixture containing 0.5% to 2.5% by volume water, an organic solvent having strong extraction properties and an organic solvent having weak extraction properties to produce an extract containing xylose free from the other sugars present in the sulfite waste liquors, and crystallizing said xylose from said extract.

15. The process of claim 14 wherein said organic solvent having strong extraction properties is selected from the group consisting of methanol, ethanol and mixtures thereof and the solvent having weak extraction properties is selected from the group consisting of isopropanol, acetone, methyl ethyl ketone and mixtures thereof.

16. The process of claim 15 wherein the mixture contains from about 30% to about 70% by volume of said solvent having strong extraction properties and from about 30% to about 70% by volume of said solvent having weak extraction properties.

17. The process of claim 16 wherein the sulfite liquors are waste liquors obtained from deciduous wood.

18. The process of claim 16 wherein said xylose is crystallized by first concentrating said extract and then adding methanol.

19. The process of claim 16 wherein the liquors are concentrated to said powder by spray drying at a temperature of about at most 130° C.

20. The process of claim 19 wherein the waste sulfite liquors produced in the manufacture of cellulose are preconcentrated to a water content of from about 30% to about 55% by weight prior to neutralization.

21. The process of claim 19 wherein the waste sulfite liquors are preconcentrated to a water content of from about 30% to about 55% prior to spray drying.

References Cited

UNITED STATES PATENTS

| | | | |
|---|---|---|---|
| 3,542,590 | 11/1970 | Paabo | 127—44 |
| 2,865,906 | 12/1958 | Höye | 260—124.3 |
| 2,431,163 | 11/1947 | Boehm | 127—37 X |
| 2,944,922 | 7/1960 | Boggs | 127—37 |
| 3,212,933 | 10/1965 | Hess | 127—37 |

OTHER REFERENCES

Chemical Abstracts 54:21754b (1960).

MORRIS O. WOLK, Primary Examiner

S. MARANTZ, Assistant Examiner

U.S. Cl. X.R.

127—37; 162—16; 260—124 R, 124 A